(12) United States Patent
Turkel et al.

(10) Patent No.: US 7,797,307 B2
(45) Date of Patent: Sep. 14, 2010

(54) QUERY GENERATION METHOD FOR QUERIES FOR INLINE VIEWS FOR AGGREGATION REFERRING TO IDENTIFIED SUBGRAPHS

(75) Inventors: Joel Turkel, Boston, MA (US); Raghuram Venkatasubramanian, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 266 days.

(21) Appl. No.: 11/340,599

(22) Filed: Jan. 27, 2006

(65) Prior Publication Data

US 2007/0185833 A1    Aug. 9, 2007

(51) Int. Cl.
*G06F 7/00* (2006.01)
*G06F 17/30* (2006.01)

(52) U.S. Cl. ...................................................... 707/714
(58) Field of Classification Search ............... 707/2, 707/1, 705, 713, 714
See application file for complete search history.

(56) References Cited

U.S. PATENT DOCUMENTS

| 5,799,309 | A  | * | 8/1998  | Srinivasan ................ 707/102 |
| 5,884,320 | A  | * | 3/1999  | Agrawal et al. ........... 707/104.1 |
| 6,341,287 | B1 | * | 1/2002  | Sziklai et al. ............... 707/102 |
| 6,477,525 | B1 | * | 11/2002 | Bello et al. ..................... 707/3 |
| 6,609,126 | B1 | * | 8/2003  | Smith et al. .................... 707/8 |
| 2002/0010695 | A1 | * | 1/2002 | Kearsey et al. ................. 707/3 |
| 2004/0220917 | A1 | * | 11/2004 | Evans et al. .................... 707/3 |

* cited by examiner

*Primary Examiner*—James Trujillo
*Assistant Examiner*—Marc Somers
(74) *Attorney, Agent, or Firm*—Hanify & King, P.C.

(57) ABSTRACT

A query generator for generating a query which retrieves a desired set of data from a relational database and performs one or more aggregation functions on the set of data is disclosed. The query generator is adapted to:

a) receive user input indicating the desired set of data and the aggregation functions to be performed;
b) identify each join subgraph for the desired set of data;
c) for each join subgraph identified in step (b), generate an inline view which, on execution, performs all of the aggregation functions that refer only to data within that join subgraph; and
d) generate an output query comprising the inline views generated in step (c) as arguments of a join.

9 Claims, 4 Drawing Sheets

QUERY GENERATION METHOD FOR QUERIES FOR INLINE VIEWS FOR AGGREGATION REFERRING TO IDENTIFIED SUBGRAPHS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to a method for generating queries, in particular for use with relational databases, and also to a query generation system for generating such queries.

(2) Description of Related Art

Query generators, for example Discoverer® from Oracle®, are used to construct database queries which are then sent to a database for execution. A user constructs a query by selecting items from a drop-down list of items displayed on the screen. The items may represent data which are to be obtained from the database, or alternatively they may represent operations that are to be performed on these data. Once the items have been selected, the query generator then generates a query, usually in structured query language (SQL) for execution by the database.

In many cases, the SQL generated for a given combination of items selected by a user is not ambiguous, and the user sees the results they expect based on the items and operations selected.

However, some types of query operate over multiple levels of aggregation. For example, the following crosstabular report output shows two levels of aggregation:

| Region | City | Sum(Profit) |
|---|---|---|
| East | | 100 |
| | New York | 50 |
| | Boston | 20 |
| | Atlanta | 30 |

The lowest level of aggregation in this case is (Region, City), that is the Sum(Profit) values are aggregated for each of the cities (New York, Boston and Atlanta) within the East Region. This lowest level of aggregation is known as the base level of aggregation. The highest level (and in this case, the only other level) of aggregation is (Region) in which the Sum(Profit) value is the total of all those of lower level.

There are situations in which the normal SQL generation algorithms of query tools cause SQL statements to be generated that yield results which, although relationally correct, are not what the user actually required. Typically, this occurs when the selected items require the calculation of aggregates of data in a plurality of separate detail tables joined to a single master table. Specific examples of such situations will be described in more detail below.

Some query tools simply present the misleading data to users without any warning or require an administrator to set up complex structures in order to generate the correct results. Rather than present data to the user which is likely to be misinterpreted, Oracle® Discoverer® generates an SQL query which will compute the base aggregation level only leaving higher levels of aggregation to be computed locally by Discoverer®. There are situations in which Discoverer® cannot compute the higher levels of aggregation correctly, leaving two options: not displaying any values for higher levels of aggregation or displaying incorrect values for higher levels of aggregation.

Clearly, there is a need for a query generator that can generate queries that reliably return data for which all aggregation has been correctly computed in all circumstances.

BRIEF SUMMARY OF THE INVENTION

In one aspect of the invention, there is provided a query generator for generating a query which retrieves a desired set of data from a relational database and performs one or more aggregation functions on the set of data, wherein the query generator is adapted to:

a) receive user input indicating the desired set of data and the aggregation functions to be performed;

b) identify each join subgraph for the desired set of data;

c) for each join subgraph identified in step (b), generate an inline view which, on execution, performs all of the aggregation functions that refer only to data within that join subgraph; and d) generate an output query comprising the inline views generated in step (c) as arguments of a join.

In a second aspect of the invention, there is provided a method for generating a query which retrieves a desired set of data from a relational database and performs one or more aggregation functions on the set of data, the method comprising:

a) receiving user input indicating the desired set of data and the aggregation functions to be performed;

b) identifying one or more subgraphs for the desired set of data;

c) for each join subgraph identified in step (b), generating an inline view which, on execution, performs all of the aggregation functions that refer only to data within that join subgraph; and d) generating an output query comprising the inline views generated in step (c) as arguments of a join.

Thus, the invention provides a query generator and method for generating a query in which aggregation can be correctly performed at any arbitrary level simply by execution of the query, even in database schemas having multiple detail tables joined to a single master table. There is no need for reaggregation after execution of the query and various performance improvements result from the queries generated, as will become apparent.

Typically, the output query causes the inline views to be joined on one or more common GROUP BY items.

In one embodiment, each inline view has a grouping ID, and the output query causes the inline views to be joined on their grouping ID's.

Each join subgraph may be identified in step (b) by:

i) selecting a source table within the desired set of data;

ii) selecting, in a sequential manner, one or more target tables joined to the source table;

iii) adding the join between the source and each target table to a list of joins if the said join is a one-to-one join or a one-to-many join when the source table on the many side;

iv) selecting each of the target tables in turn as a new source table; and v) repeating steps (ii) to (iv) recursively.

Preferably, step (c) determines which of the aggregation functions refer only to data within a join subgraph by:

i) generating a list of all possible aggregation levels for the desired set of data; and ii) removing from the list each of the possible aggregation levels that are not contained in the join subgraph.

Normally, the query generator is further adapted to receive user input indicating a calculation to be performed which requires data from more than one subgraph, and to generate an output query in step (d) that performs said calculation.

In a third aspect of the invention, computer program code means is adapted to perform the method of the second aspect of the invention when said program is run on a computer.

In a fourth aspect of the invention, a computer program product comprises program code means stored on a computer readable medium for performing the method of the second aspect of the invention when said program is run on a computer.

BRIEF DESCRIPTION OF THE SEVERAL VIEWS OF THE DRAWING(S)

Examples of the present invention will now be described with reference to the accompanying drawings, in which.

DETAILED DESCRIPTION OF THE INVENTION

Figure 1:
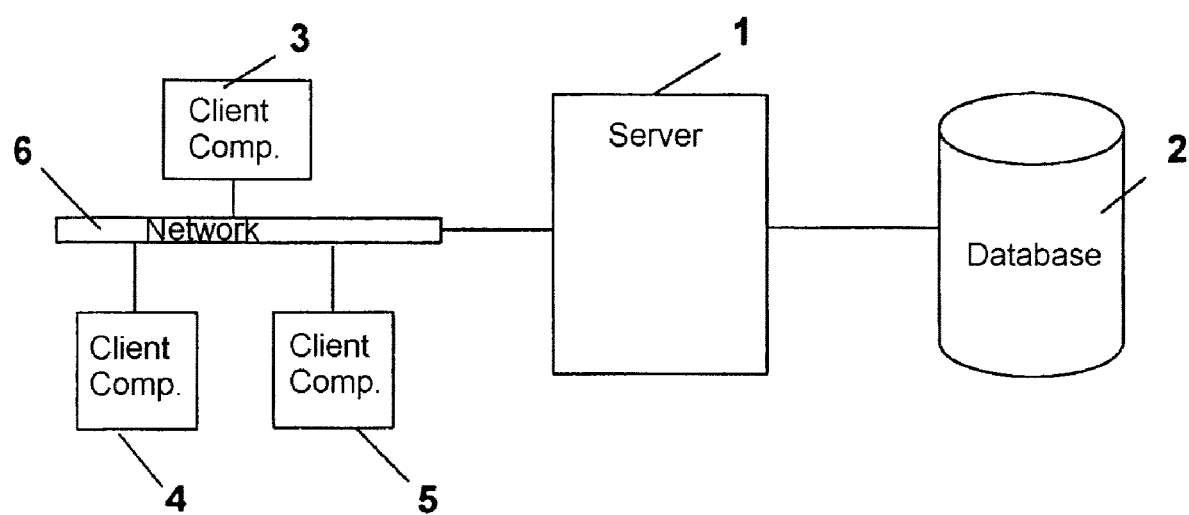
FIG. 1 shows a query generator system on which the invention may be implemented.

FIG. 1 shows a server 1 which is connected to a database 2. The server 1 is operable to receive requests from client computers 3, 4, 5 via a network 6. This network 6 may be any network, such as a local area network (LAN) or indeed it may be the Internet. Each of the client computers 3, 4, 5 runs query generator software that can construct a query in response to user input and transmit the query over network 6 to the server 1. The server 1 then executes the received query and extracts the necessary data from database 2 and performs any necessary computations on it before returning the results over the network 6 to the respective client computer 3, 4 or 5.

Figure 2:
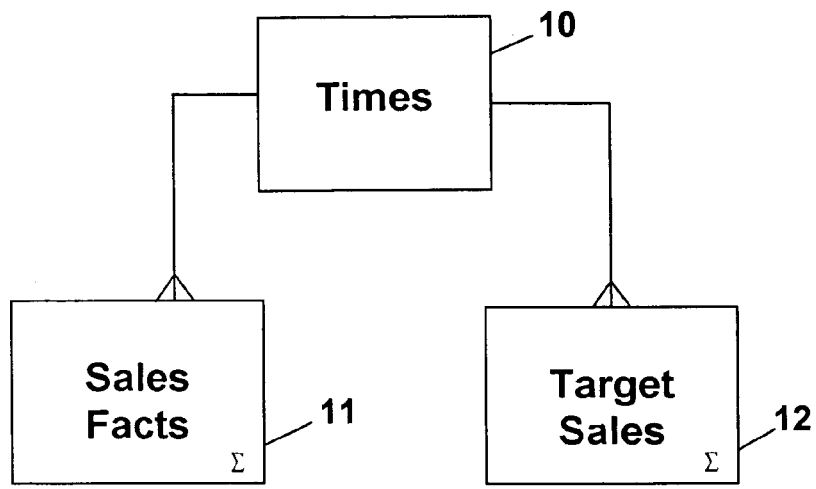
FIG. 2 shows the relationship between three tables forming part of a relational database.

A first example will now be explained with reference to FIG. 2, in which there are shown three separate tables. The first table, entitled "Times" and shown by the reference numeral 10 is a master table having a one to many relationship with two detail tables. These detail tables are known as the "Sales Facts" table and the "Target Sales" table, and they are indicated by the reference numerals 11 and 12 respectively. FIG. 2 also shows the data held in each of these tables. As can be seen, the tables are related by the TIME_KEY value. There is one entry for each value of TIME_KEY in the Times table 10, and many entries for each value in each of the Sales Facts table 11 and the Target Sales table 12.

In this first example, a user requires to compare the sales represented by data in the Sales Facts table 11 with target sales represented by data in the Target Sales table 12 for each year shown in the Times table 10. To do this, they would use the query tool to select the sales item from the Sales Facts table 11, the target sales item from the Target Sales table 12 and the year item from the Times table 10.

The normal behavior of SQL generation tools is to join all the required tables and then compute the results. According to this normal behavior, the query generator would produce the following SQL statement:

```
SELECT TIMES.YEAR, SUM(SALES_FACT.SALES) AS
SUM_SALES,
    SUM(TARGET_SALES.TARGET_SALES) AS
    SUM_TARGET_SALES
FROM TIMES INNER JOIN SALES_FACT
ON (TIMES.TIME_KEY = SALES_FACT.TIME_KEY)
INNER JOIN TARGET_SALES
ON (TIMES.TIME_KEY = TARGET_SALES.TIME_KEY)
GROUP BY TIMES.YEAR
```

In this SQL statement, the SELECT clause specifies which columns and calculations should be presented to the user. In this case, these are the Year column and the sum of the Sales column and the sum of the Target_Sales column. The FROM clause specifies the tables or views from which the data will be obtained, in this case the Times table 10 joined to the Sales Facts table 11 and to the Target Sales table 12. The GROUP BY clause specifies for which column the values are to be taken as common values for aggregation purposes, for example, all rows having the value 1999 in the year column are combined to produce a single row with aggregated (in this case summed) values for the Sales and Target_Sales columns.

This SQL statement causes each of the detail tables, that is the Sales Facts table 11 and the Target Sales table 12, to be joined to the master Times table 10. As a result, every row in the Sales Facts table 11 is matched with every row in the Target Sales table 12 having the same value of TIME_KEY. Thus, this SQL statement produces the following results:

| YEAR | SUM_SALES | SUM_TARGET_SALES |
|------|-----------|------------------|
| 1999 | 150       | 950              |
| 2000 | 50        | 150              |

It can be seen from this that although the SUM_SALES column is correct, the SUM_TARGET SALES column is incorrect. This is because the value from the Target Sales table 12 has been repeated for each occurrence of the TIME_KEY value in the Sales Facts table 11. Thus, the SUM_TARGET_SALES value shown from 1999 is 100*5+150*3, whilst that shown for 2000 is 50*3.

Whilst these numbers are relationally correct, they are not meaningful to the end user, and are not the values that are expected to be returned. The joins in the SQL statement cause every row in the Sales Facts table 11 to be matched with every row in the Target Sales table 12. Thus, the value of the sum of TARGET_SALES from the Target Sales table 12 has been repeated for each instance of each value of the TIME_KEY in the Sales Facts table 11.

It is possible to return the correct values from the database using the following two SQL statements:

```
SELECT TIMES.YEAR, SUM(SALES_FACT.SALES) AS
SUM_SALES
FROM TIMES INNER JOIN SALES_FACT
ON (TIMES.TIME_KEY = SALES_FACT.TIME_KEY)
GROUP BY TIMES.YEAR
and:
SELECT TIMES.YEAR, SUM(TARGET_SALES.TARGET_SALES)
AS
    SUM_TARGET SALES
FROM TIMES INNER JOIN TARGET_SALES
ON (TIMES.TIME_KEY = TARGET_SALES.TIME_KEY)
GROUP BY TIMES.YEAR
```

These two statements produce the two tables shown below:

| YEAR | SUM_SALES |
|---|---|
| 1999 | 150 |
| 2000 | 50 |

| YEAR | SUM_TARGET_SALES |
|---|---|
| 1999 | 250 |
| 2000 | 50 |

However, the result that the user is actually looking for is the combination of the above two tables to form a single table result set. What is actually happening, however, when the user selects aggregations from two or more detail tables is that the SQL statement causes all the tables to be joined together giving all possible combinations from the joins and only then does the aggregation.

Currently Oracle® Discoverer® solves this problem by performing the method described in our co-pending European patent application number 00302134.2. In the method described therein, the Discoverer® query tool detects that an aggregation is being performed on more than one detail table and generates an SQL statement that creates an inline view that computes the aggregation of each detail table to the level of the master table's primary key and then joins the two inline views on the master table's primary key. Reaggregation to the desired base aggregation level is then performed. Any higher levels of aggregation needed by the query are computed by the Discoverer® server. Thus, in this example Discoverer® would generate and execute the following SQL statement before computing any totals in the Discoverer® server:

```
SELECT V1.YEAR, SUM(V1.SUM_SALES) AS SUM_SALES,
    SUM(V2.SUM_TARGET_SALES) AS SUM_TARGET_SALES
FROM
-Transient Complex Folder V1
(
    -Aggregate the SALES_FACT table to the level (TIME_KEY) since
    -TIME_KEY is the primary key of the common master table TIMES
    SELECT TIMES.TIME_KEY, TIMES.YEAR,
        SUM(SALES_FACT.SALES) AS SUM_SALES
    FROM SALES_FACT INNER JOIN TIMES
    ON (SALES_FACT.TIME_KEY = TIMES.TIME_KEY)
    GROUP BY TIMES.TIME_KEY, TIMES.YEAR
) V1
    INNER JOIN
-Transient Complex Folder V2
(
    -Aggregate the TARGET_SALES table to the level (TIME_KEY)
    -since
    TIME_KEY is the primary key of the common master table
    TIMES
    SELECT TARGET_SALES.TIME_KEY,
        SUM(TARGET_SALES.TARGET_SALES)
            AS SUM_TARGET_SALES
    FROM TARGET_SALES
    GROUP BY TARGET_SALES.TIME_KEY
) V2
-Join the two aggregate fact table views and the TIMES table on the
-TIMES table primary key of TIME_KEY. This ensures that the
-join can safely be performed without duplicating rows
ON (V1.TIME_KEY = V2.TIME_KEY)
-Reaggregate the query from the level of (TIME_KEY) to the level of
(YEAR)
GROUP BY V1.YEAR
```

Within this statement there are comments provided (on the lines beginning with "-") which indicate the function of each part of the statement.

This SQL statement leads to the following results set:

| YEAR | SUM_SALES | SUM_TARGET_SALES |
|---|---|---|
| 1999 | 150 | 250 |
| 2000 | 50 | 50 |

Figure 3:
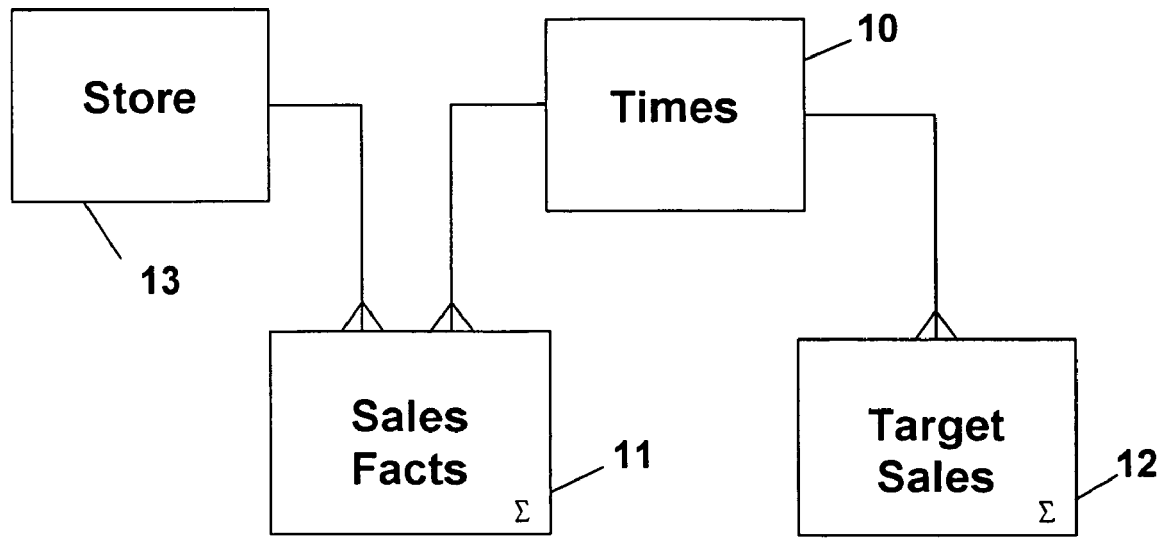
FIG. 3 shows the three tables of FIG. 2 along with a fourth table.

A second example will now be described with reference to FIG. 3, which shows the tables of FIG. 2 along with an additional table 4 known as the "Store" table 13. This has a one to many relationship with the Sales Facts table 11. FIG. 3 also shows the raw data from the store table 13, and as can be seen this includes a STORE_KEY value with an associated region value. The STORE_KEY values of 1 or 3 are associated with the same value for REGION.

In this example, a user requires to retrieve the sum of sales and sum of target sales for each region in each year. By selecting the required items and operations from Discoverer®, the following SQL statement would be generated:

```
SELECT V1.YEAR, V1.REGION, SUM(V1.SUM_SALES) AS
SUM_SALES,
    SUM(V2.SUM_TARGET_SALES)
    AS SUM_TARGET_SALES
FROM
-Transient Complex Folder V1
(
-Aggregate the SALES_FACT table to the level (TIME_KEY) since
-TIME_KEY is the primary key of the common master table TIMES
    SELECT STORE.REGION, TIMES.TIME_KEY, TIMES.YEAR,
        SUM(SALES_FACT.SALES) AS SUM_SALES
    FROM SALES_FACT INNER JOIN TIMES
    ON (SALES_FACT.TIME_KEY = TIMES.TIME_KEY)
    INNER JOIN STORE
    ON (SALES_FACT.STORE_KEY = STORE.STORE_KEY)
    GROUP BY TIMES.TIME_KEY, TIMES.YEAR, STORE.REGION
) V1
    INNER JOIN
```

-continued

```
-Transient Complex Folder V2
(
-Aggregate the TARGET_SALES table to the level (TIME_KEY) since
-TIME_KEY is the primary key of the common master table TIMES
    SELECT SALES_FACT.TIME_KEY,
    SUM(TARGET_SALES.TARGET_SALES) AS
    SUM_TARGET_SALES
    FROM TARGET_SALES
    GROUP BY TARGET_SALES.TIME_KEY
) V2
-Join the two aggregate fact table views and the TIMES table on the
-TIMES table primary key of TIME_KEY. This ensure that the join can
-safely be performed without duplicating rows
ON (V1.TIME_KEY = V2.TIME_KEY)
-Reaggregate the query from the level of (TIME_KEY, REGION) to
-the level of (YEAR, REGION)
GROUP BY V1.YEAR, V1.REGION
```

However, this leads to the following results set:

| YEAR | REGION | SUM_SALES | SUM_TARGET_SALES |
|---|---|---|---|
| 1999 | East | 100 | 250 |
| 1999 | West | 50 | 250 |
| 2000 | East | 30 | 50 |
| 2000 | West | 20 | 50 |

As can be seen from this set of results, the value of target sales is repeated for each region. Thus, if a total of SUM_TARGET_SALES values was computed in the Discoverer® server from this result set an incorrect value of 600 would be displayed. At present, Discoverer® currently detects such scenarios and leaves these potentially incorrect cells blank, i.e. it does not display values which are potentially incorrect.

In order to assist in describing the operation of the embodiment of the invention it is helpful to define a few terms. These are "join subgraph", "inline view", "GROUP BY items" and "GROUPING_IDs".

Each query has a graph (or network) of joins. The nodes in this graph or network are individual tables (or folders) and the links that connect the nodes are joins. A join subgraph is simply a subset of a query's graph. Thus, with respect to the example of FIG. 2, a query may refer to the Times table 10, the Sales Facts table 11 and the Target Sales 12 and specify that the Times table 10 is joined to the Sales Facts table 11 and to the Target Sales table 12. Therefore, a potential subgraph of such a query may contain only the Times and Sales Facts table linked together by a join.

An inline view is created by the presence of a nested select statement in an SQL query. This nested select statement appears in the FROM clause. For example, in the following SQL statement:

```
SELECT V1.REGION, V1.SUM_SALES/V1.SUM_PROFIT
FROM
(
SELECT REGION, SUM(SALES) AS SUM_SALES,
    SUM(PROFIT) AS SUM_PROFIT
FROM MY_DATA
GROUP BY REGION
) V1
```

V1 defines the following inline view:

```
SELECT REGION, SUM(SALES) AS SUM_SALES,
    SUM(PROFIT) AS SUM_PROFIT
FROM MY_DATA
GROUP BY REGION
```

A GROUP BY statement is used to specify an item by which data should be summarized. For example, the following SQL query summarizes data at the (REGION, YEAR) aggregation level:

```
SELECT REGION, YEAR, SUM(SALES)
FROM MY_DATA
GROUP BY REGION, YEAR
```

This query has GROUP BY items region and year.

GROUPING_ID is a function that is used to identify the aggregation level of a given row of an SQL query. For example, the following SQL statement:

```
SELECT REGION, YEAR, SUM (SALES), GROUPING_ID(REGION)
FROM MY_DATA
GROUP BY GROUPING SETS ((YEAR), (REGION, YEAR))
``` produces rows at the aggregation levels (REGION, YEAR) and (YEAR). The function GROUPING_ID(REGION) will return zero for rows that correspond to an aggregation level that contains values for REGION and one in all other circumstances. Thus, in this example the function GROUPING_ID (REGION) will return zero for rows at the (REGION, YEAR) aggregation level and one for rows at the (YEAR) aggregation level. For the aggregation level (YEAR), we say that region is "rolled up" since it is not contained in the aggregation level.

The invention provides a new mode of operation for a query generator, such as the Discoverer® server, which upon detection of either of the above scenarios operates according to a new algorithm. The new algorithm is as follows. Firstly, user input is received (step 20 of FIG. 4) that indicates a desired set of data to retrieve and one or more aggregation functions to perform on that data. An inline view is then generated for each join subgraph within the set of data. On execution, each inline view will perform all aggregation functions (not just at the base aggregation level) that refer to data within that inline view. The inline views are used to form an SQL output query in which they are joined on common GROUP BY items and their GROUPING_IDs. Finally, a calculation involving elements from more than one of the inline views is computed.

Figure 4:
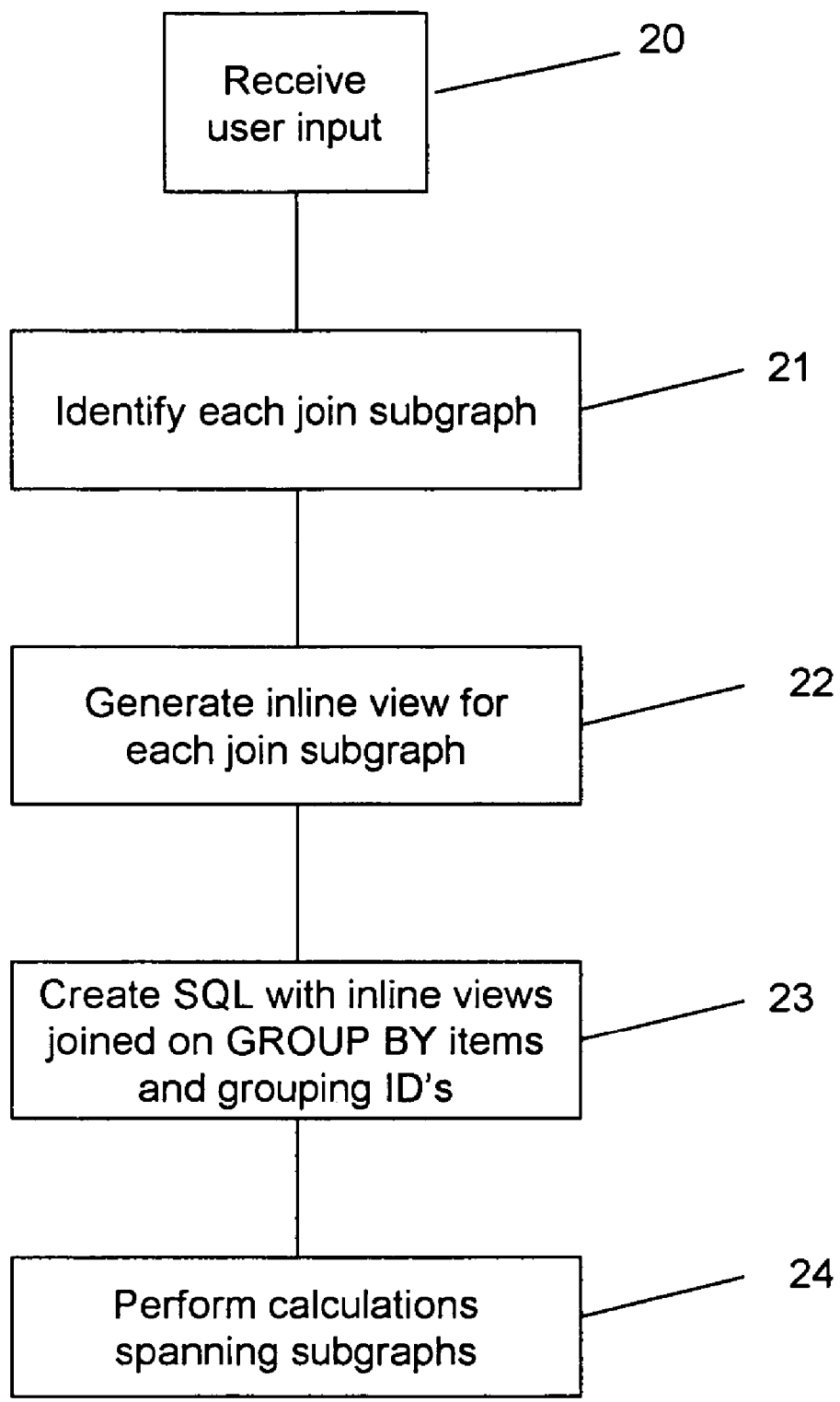
FIG. 4 shows a flow chart representing the method performed by the invention.

Thus, the algorithm carries out the following steps:

1) divide the query's join graph into subgraphs (step 21 of FIG. 4);

2) generate inline views that will perform all necessary aggregation in each subgraph (step 22 of FIG. 4);

3) generate an SQL output query that comprises each inline view joined on common GROUP BY items and their grouping ID's if the items are potentially rolled up (step 23 of FIG. 4); and 4) compute any calculation spanning subgraphs (step 24 of FIG. 4). This calculation will be specified as part of the user input in step 20 of FIG. 4.

The basic method for computing the join subgraph in step 1, which assumes that the join configuration is not circular, is:

1. Initialize an empty variable JoinSubGraph

2. Execute the function ExpandSubGraph(JoinSubGraph, VisitedJoinSet, element.getSourceTable( ), QueryJoinGraph).

Of the arguments to the ExpandSubGraph function: JoinSubGraph is the variable which will be populated by the execution of the ExpandSubGraph function to contain the join subgraph; once a join has been processed it is added to VisitedJoinSet, which therefore contains the joins that have already been processed by the ExpandSubGraph function; all joins emanating from element.getSourceTable( ) are recursively explored, and this argument therefore refers to the database table from which the ExpandSubGraph function should recurse; and QueryJoinGraph is a collection of all the joins in the subject query.

The function ExpandSubGraph performs the following actions:

For each join in the QueryJoinGraph variable that involves SourceTable and is not in VisitedJoinSet:
   a) Set variable TargetTable to the table other than the source table that is joined by the join
   b) Add the join to the VisitedJoinSet variable
   c) If join is a one-to-one join or a one-to-many join with the source table on the many side:
      i) Add join to the JoinSubGraph variable
      ii) Execute ExpandSubGraph(JoinSubGraph, VisitedJoinSet, TargetTable, QueryJoinGraph) (i.e. the ExpandSubGraph is executed recursively)

In the second example, this leads to the following subgraphs:

Subgraph 1:
   Aggregates: SUM(SALES_FACTS.SALES)
   Joins: SALES_FACTS->TIMES, SALES_FACTS->STORE Subgraph 2:
   Aggregates: SUM(TARGET_SALES.TARGET_SALES)
   Joins: TARGET_SALES->TIMES In step 2, the algorithm determines the aggregation levels which it is necessary to compute for each of the subgraphs, and then creates inline views for each of the subgraphs that will perform, when executed, the necessary aggregation. This is done using the following method:

For each AggregationLevel in QueryAggregationLevelSet:
   Set variable SubgraphAggregationLevel=AggregationLevel
   Remove items from SubgraphAggregationLevel that are not contained in the subgraph
   Add SubgraphAggregationLevel to the set of AggregationLevels needed from the subgraph In this algorithm AggregationLevel is a variable that specifies the level at which the data is summarized. For example, an AggregationLevel of (REGION, YEAR) specifies that the data is to be broken down by REGION and YEAR as shown in the following table:

| REGION | YEAR | SUM (PROFIT) |
|---|---|---|
| East | 1999 | 45 |
| West | 1999 | 60 |
| West | 2000 | 70 |
| ... | ... | ... |

QueryAggregationLevelSet is the set of all aggregation levels needed by the query. Thus, in the present example this variable will contain the following values, representing all the aggregation levels for the query:

(REGION, YEAR), (YEAR), ( ) (where ( ) represents a grand total aggregation level)

The variable SubgraphAggregationLevelSet is the set of aggregation levels that must be computed for a given join subgraph. This may be different from the query aggregation level set variable since the subgraph typically does not contain all the items in the query.

In example 2, this algorithm leads to the following aggregation levels for each subgraph:

Subgraph 1: (REGION, YEAR), ( )

Subgraph 2: (YEAR), ( )

where ( ) is a grand total aggregation level.

In step 3, the SQL output query is generated by joining the inline views generated in step 2. In a general case where there are N subgraphs (and thus N inline views), N−1 joins will be needed. Each of the joins is generated as follows:

1. Selected a random subgraph as the starting point

2. For every subgraph other than the selected subgraph, generate the subgraph's join condition as follow:

For each GROUP BY item of the subgraph's base (i.e. lowest) aggregation level add an equality expression to the join condition that joins the item to the most recently processed subgraph that also contains that item (both on the item value and on the GROUPING_ID of the item).

In example 2, subgraph 2 could be selected randomly as the starting point. Subgraph 1 is then processed as follows:

1) Subgraph 1 has the following GROUP BY items in its base aggregation level: REGION and YEAR (from step 2)

2) Region is not projected from any of the currently joined in subgraphs (currently on subgraph 2) so can be ignored. This is because subgraph 2, which has already been processed, has the GROUP BY item YEAR whilst subgraph 1 has the GROUP BY items REGION and YEAR. The purpose of this step is to join subgraph 2 into the previously joined subgraphs based on its GROUP BY items (REGION and YEAR). However, REGION does not appear in any of the previously processed subgraphs so it can be ignored for the purposes of this join condition.

3) Year was in the base aggregation level of the most recently processed from subgraph 2, so the join expression: subgraph1.YEAR=subgraph2.YEAR AND subgraph1.YEAR_GROUPING_ID=subgraph2.YEAR_GROUPING_ID will be generated. This join expression states that the YEAR values and GROUPING_ID (YEAR) values in subgraphs 1 and 2 are to be equal. The GROUPING_ID part of the join condition means that rows will be matched where the aggregation levels of both rows contain YEAR or the aggregation levels of both rows do not contain YEAR. For example, one row cannot correspond to the aggregation level (RE- GION, YEAR) and the other row correspond to the aggregation level (REGION). As mentioned, subgraph 2 is selected since it is the most recently processed subgraph that also contains YEAR. Although this is an arbitrary selection, it is necessary in situations where the third subgraph, subgraph 3, that contains the GROUP BY item YEAR is being processed. In generating the join condition for subgraph 3 it can either be joined to subgraph 1 (i.e. subgraph3.YEAR=subgraph1.YEAR) or to subgraph 2 (i.e. subgraph3.YEAR=subgraph2.YEAR). The end result will be the same in either case (since the join condition subgraph1.YEAR=subgraph2.YEAR has already been generated earlier in the algorithm). This step of the algorithm simply chooses to pick the most recently processed subgraph. The join expression is actually wrapped in an NVL2 function so that a NULL value will join to other NULL values which does not happen by default in ANSI SQL, in which the expression NULL=NULL always returns false.

In step 4, any calculation that spans subgraphs is added to the output query. This step is not necessary for either of the examples presented here. An example of such a calculation would be:

SUM(SALES_FACTS.SALES)/SUM(TARGET_SALES.TARGET_SALES)

This would be added to the SQL that joins all of the subgraphs together. For example, in the SQL statement below it would be added to the outermost SQL block.

Thus, in the first example the SQL statement generated by this algorithm would be:

```
SELECT V1.YEAR, V1. SUM_SALES, V2.SUM_TARGET_SALES
FROM
(
  SELECT TIMES.YEAR, SUM(SALES_FACT.SALES) AS
    SUM_SALES
  FROM TIMES INNER JOIN SALES_FACT
    ON (TIMES.TIME_KEY = SALES_FACT.TIME_KEY)
  GROUP BY TIMES.YEAR
) V1
FULL OUTER JOIN
(
  SELECT TIMES.YEAR, SUM(TARGET_SALES.TARGET.SALES)
    AS
    SUM_TARGET_SALES
  FROM TIMES INNER JOIN TARGET_SALES
    ON (TIMES.TIME_KEY = TARGET_SALES.TIME_KEY)
  GROUP BY TIMES.YEAR
) V2
ON (NVL(V1.YEAR,'NULL') = NVL(V2.YEAR,'NULL'))
```

This leads to the following result set:

| YEAR | SUM_SALES | SUM_TARGET_SALES |
|------|-----------|------------------|
| 1999 | 150       | 250              |
| 2000 | 50        | 50               |

As can be seen, this is exactly the results set that the user requires.

In respect of example 2, the SQL statement generated by the new algorithm would be:

```
SELECT V1.YEAR, V1.REGION, V1.SUM_SALES,
V2.SUM_TARGET_SALES,
  V1.GID
FROM
(
  SELECT STORE.REGION, TIMES.YEAR,
  SUM(SALES_FACT.SALES) AS
    SUM_SALES, GROUPING_ID(TIMES.YEAR) AS GID
  FROM TIMES INNER JOIN SALES_FACT
  ON (TIMES.TIME_KEY = SALES_FACT.TIME_KEY)
  INNER JOIN STORE
  ON (STORE.STORE_KEY = SALES_FACT.STORE_KEY)
  GROUP BY GROUPING SETS
  ((STORE.REGION,TIMES.YEAR),( ))
) V1
FULL OUTER JOIN
(
  SELECT TIMES.YEAR,
  SUM(TARGET_SALES.TARGET_SALES) AS
    SUM_TARGET_SALES, GROUPING_ID (TIMES.YEAR)
    AS GID
  FROM TIMES INNER JOIN TARGET_SALES
  ON (TIMES.TIME_KEY = TARGET_SALES.TIME_KEY)
  GROUP BY ROLLUP(TIMES.YEAR)
) V2
-YEAR's GID must be included in the join condition to distinguish
-between rows that have a NULL YEAR due to YEAR being aggregated
-out and rows where the YEAR value just happens to be a NULL
ON (NVL(V1.YEAR,'NULL') = NVL(V2.YEAR,'NULL')
AND V1.GID = V2.GID)
```

This leads to the following result set:

| YEAR | REGION | SUM_SALES | SUM_TARGET_SALES | GID |
|------|--------|-----------|------------------|-----|
| 1999 | West   | 50        | 250              | 0   |
| 1999 | East   | 100       | 250              | 0   |
| 2000 | West   | 20        | 50               | 0   |
| 2000 | East   | 30        | 50               | 0   |
|      |        | 200       | 300              | 1   |

As can be seen, the grand totals are pushed down into the aggregation inline views and are thus computed correctly.

As will be appreciated, this solution overcomes all of the disadvantages of the prior art. In particular, the prior art suffered from the following disadvantages:

1) Decreased performance by requiring two GROUP BY operations. As the examples have shown the prior art algorithm required a GROUP BY operation for each transient complex folder and for the main query. GROUP BY operations are computationally expensive because rows with matching values from GROUP BY items (e.g. the same combination of REGION and YEAR values) must be identified. Thus, the fewer GROUP BY operations used the better. The new algorithm will only generate one GROUP BY for each subgraph.

2) Decreased performance because reaggregation prevents certain relational database management system optimizations like predicate pushing. An example of this would be adding the filter YEAR=1999 to example 1. In the SQL for the prior art algorithm this predicate could not be applied before computing V2 since YEAR is not a GROUP BY item of V2. Thus, SUM(TARGET_SALES) values must be computed for all years when in fact we only need to compute it for YEAR=1999. The new algorithm ensures that all predicates are pushed into applicable subgraphs.

3) Resolvable scenarios are limited because master tables must be joined to detail tables with the same join key. The new algorithm is much more flexible than the prior art algorithm and can support more query join configurations. Also scenarios with aggregate functions that cannot be reaggregated (e.g. COUNT DISTINCT) can now be resolved since no reaggregation is used.

4) Higher levels of aggregation cannot always be computed accurately from the "resolved" base aggregation level. Example 2 illustrates one such scenario where the prior art algorithm could not compute higher levels of aggregation but the new algorithm can. The reason for this is that all aggregation levels are computed before the subgraphs are joined together (and hence before rows are potentially erroneously duplicated).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out the distribution. Examples of computer readable media include recordable-type media such as floppy disc, a hard disc drive, RAM and CD-ROMs as well as transmission-type media, such as digital and analogue communications links.

The invention claimed is:

1. A query generator comprising a client computer system running query generator software for generating a query which retrieves a desired set of data from a relational database and performs one or more aggregation functions on the set of data, wherein the query generator is adapted to:
   a) receive user input indicating the desired set of data and the aggregation functions to be performed;
   b) automatically identify one or more subgraphs for the desired set of data by:
      i) selecting a source table within the desired set of data;
      ii) selecting, in a sequential manner, one or more target tables joined to the source table;
      iii) determining whether the said join is a one-to-one join or a one-to-many join and adding the join between the source and each target table to a list of joins if the said join is a one-to-one join or a one-to-many join when the source table is on the many side;
      iv) selecting each of the target tables in turn as a new source table; and
      v) repeating steps (ii) to (iv) recursively, and going to step (c) when there are no more target tables joined to a source table;
   c) for each join subgraph identified in step (b), automatically generate an inline view which, on execution, performs all of the aggregation functions that refer only to data within that join subgraph; and
   d) automatically generate an output query comprising the inline views generated in step (c) as arguments of a join, and wherein step (c) determines which of the aggregation functions refer only to data within a join subgraph by:
      i) generating a list of all possible aggregation levels, including a base aggregation level and all higher levels of aggregation, for the desired set of data; and
      ii) removing from the list each of the possible aggregation levels that are not contained in the join subgraph.

2. A query generator according to claim 1, wherein the output query causes the inline views to be joined on one or more common GROUP BY items.

3. A query generator according to claim 2, wherein each inline view has a grouping ID, and the output query causes the inline views to be joined on their grouping ID's.

4. A query generator according to claim 1, wherein the query generator is further adapted to receive user input indicating a calculation to be performed which requires data from more than one subgraph, and to generate an output query in step (d) that performs said calculation.

5. A method for generating a query which retrieves a desired set of data from a relational database and performs one or more aggregation functions on the set of data, the method comprising:
   a) receiving user input indicating the desired set of data and the aggregation functions to be performed;
   b) identifying one or more subgraphs for the desired set of data by:
      i) selecting a source table within the desired set of data;
      ii) selecting, in a sequential manner, one or more target tables joined to the source table;
      iii) determining whether the said join is a one-to-one join or a one-to-many join and adding the join between the source and each target table to a list of joins if the said join is a one-to-one join or a one-to-many join when the source table is on the many side;
      iv) selecting each of the target tables in turn as a new source table; and
      v) repeating steps (ii) to (iv) recursively, and going to step (c) when there are no more target tables joined to a source table;
   c) for each join subgraph identified in step (b), generating an inline view which, on execution, performs all of the aggregation functions that refer only to data within that join subgraph; and
   d) generating an output query comprising the inline views generated in step (c) as arguments of a join, and wherein step (c) determines which of the aggregation functions refer only to data within a join subgraph by:
      i) generating a list of all possible aggregation levels, including a base aggregation level and all higher levels of aggregation, for the desired set of data; and
      ii) removing from the list each of the possible aggregation levels that are not contained in the join subgraph.

6. A method according to claim 5, wherein the output query causes the inline views to be joined on one or more common GROUP BY items.

7. A method according to claim 6, wherein each inline view has a grouping ID, and the output query causes the inline views to be joined on their grouping ID's.

8. A method according to claim 5, wherein the query generator is further adapted to receive user input indicating a calculation to be performed which requires data from more than one subgraph, and to generate an output query in step (d) that performs said calculation.

9. A computer program product comprising program code means stored on a computer readable medium for performing, when said program code is run on a computer, a method for generating a query which retrieves a desired set of data from a relational database and performs one or more aggregation functions on the set of data, the method comprising:
   a) receiving user input indicating the desired set of data and the aggregation functions to be performed;
   b) identifying one or more subgraphs for the desired set of data by:
      i) selecting a source table within the desired set of data;

ii) selecting, in a sequential manner, one or more target tables joined to the source table;

iii) determining whether the said join is a one-to-one join or a one-to-many join and adding the join between the source and each target table to a list of joins if the said join is a one-to-one join or a one-to-many join when the source table is on the many side;

iv) selecting each of the target tables in turn as a new source table; and v) repeating steps (ii) to (iv) recursively, and going to step (c) when there are no more target tables joined to a source table;

c) for each join subgraph identified in step (b), generating an inline view which, on execution, performs all of the aggregation functions that refer only to data within that join subgraph; and d) generating an output query comprising the inline views generated in step (c) as arguments of a join, and wherein step (c) determines which of the aggregation functions refer only to data within a join subgraph by:

i) generating a list of all possible aggregation levels, including a base aggregation level and all higher levels of aggregation, for the desired set of data; and ii) removing from the list each of the possible aggregation levels that are not contained in the join subgraph.

* * * * *

UNITED STATES PATENT AND TRADEMARK OFFICE
CERTIFICATE OF CORRECTION

| | |
|---|---|
| PATENT NO. | : 7,797,307 B2 |
| APPLICATION NO. | : 11/340599 |
| DATED | : September 14, 2010 |
| INVENTOR(S) | : Joel Turkel et al. |

It is certified that error appears in the above-identified patent and that said Letters Patent is hereby corrected as shown below:

In column 4, line 28, delete "SUM_TARGET SALES" and insert -- SUM_TARGET_SALES --, therefor.

Signed and Sealed this
Sixteenth Day of August, 2011

David J. Kappos
*Director of the United States Patent and Trademark Office*